F. L. & E. T. BOONE.
SQUARE.
APPLICATION FILED JULY 11, 1914.
1,176,026.
Patented Mar. 21, 1916.
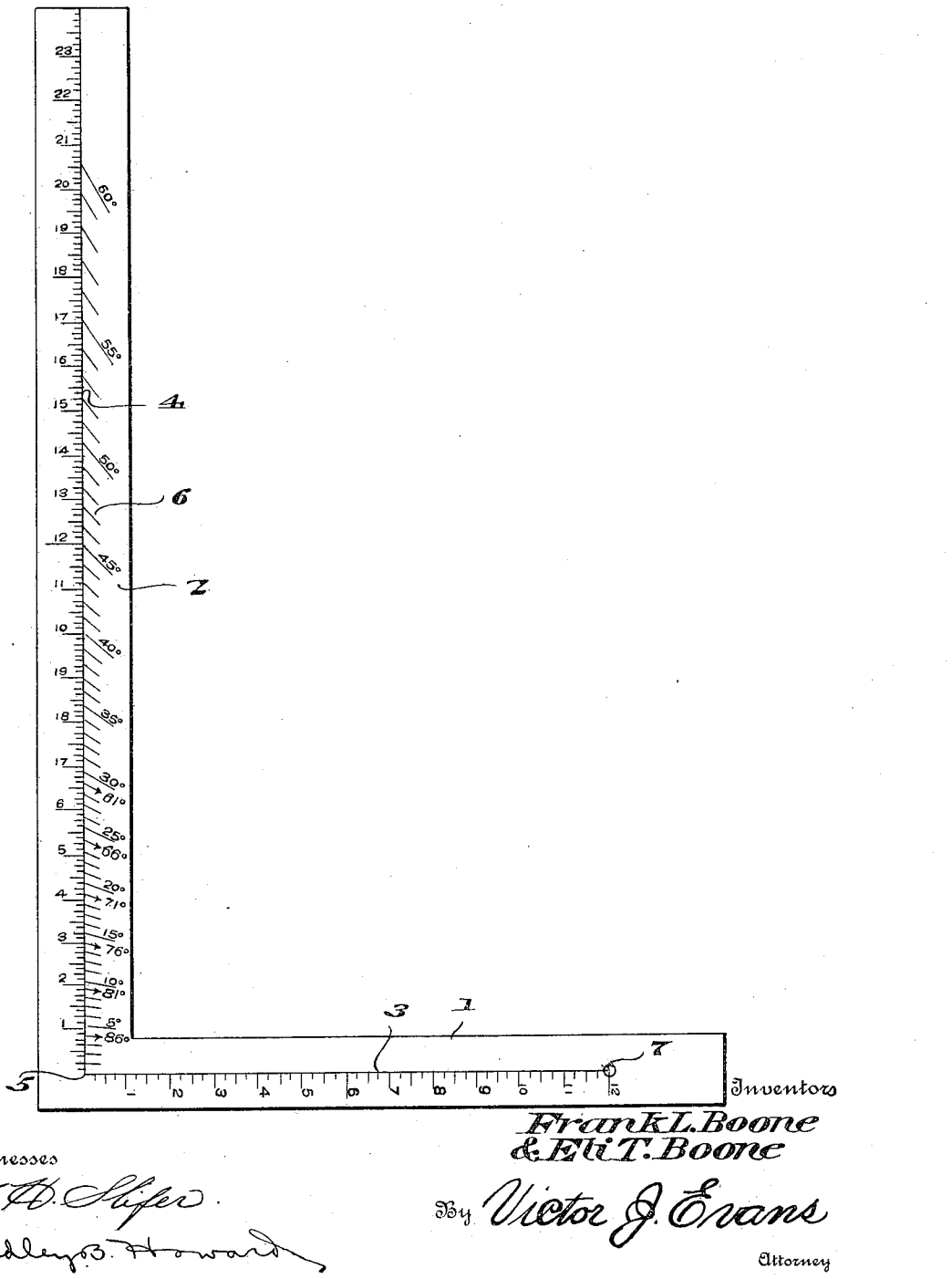

UNITED STATES PATENT OFFICE.

FRANK L. BOONE AND ELI T. BOONE, OF GREENSBORO, PENNSYLVANIA.

SQUARE.

1,176,026.      Specification of Letters Patent.      Patented Mar. 21, 1916.

Application filed July 11, 1914. Serial No. 850,367.

*To all whom it may concern:*

Be it known that we, FRANK L. BOONE and ELI T. BOONE, citizens of the United States, residing at Greensboro, in the county of Greene and State of Pennsylvania, have invented new and useful Improvements in Squares, of which the following is a specification.

This invention relates to a square for use by carpenters and builders, the primary object being to provide a square which is of the ordinary construction, but which is provided with scales graduated on its faces by the use of which a carpenter may determine the run of a roof readily by simple computations, when the rise and angle of the roof are given, or may determine the rise when the run and angle of inclination are given.

The invention consists in the features of construction, combination, and arrangement of parts, hereinafter fully described and claimed, reference being had to the accompanying drawing, which represents:

A side elevation of a square graduated in accordance with the invention.

The square is constructed in the manner shown with its short leg 1 arranged at right angles to the long leg 2. Longitudinal lines 3 and 4 are inscribed medially upon the legs 1 and 2 respectively, and intersect each other at right angles at the point 5. A scale of linear measurement is provided coextensive with each of said lines and reads from the point 5, each scale being graduated preferably in inches and fractions thereof. A degree scale is provided upon the long leg of the square by the graduated lines 6 which radiate from a common center 7, which latter is located on the line 3 at a distance of 12″ from the point 5. The leg 2 of the square is approximately twice as long as the leg 1 so that the line 4 will be long enough to subtend an angle of 60°.

The use of the device will now be described. Assuming that a carpenter is given instructions to build a house 24′ wide having a common roof whose angle of pitch is 15°, the instrument may be used to give the rise in inches or feet in a very short space of time. It is known that the run of the roof will be 12′ or one-half of 24′. Referring to the angle scale of the square, it will be seen that 15° thereon is subtended by a length of $3\frac{1}{4}''$ on the altitude line 4, considering the line 3 as the base of the triangle in question. From this triangle, the carpenter may obtain the desired result by working a simple proportion equation. It is obvious that the desired rise of the roof in inches is to the run as $3\frac{1}{4}''$ is to 12″, so we have the equation $$\frac{x}{144} = \frac{3\frac{1}{4}}{12}.$$

The result therefore is that $x=39''$ or 3′ 3″, the rise of the roof. In this manner the rise of a roof having any angle of pitch up to 60° may be determined readily, or the run may be found when the rise and angle are given. However, when a roof whose angle of pitch is greater than 60° is to be considered, the instrument may still be used in determining the rise or run, even though its angle scale does not exceed 60°. In this instance, the line 4 is used as the base of the computing triangle and the line 3 as the altitude thereof. The length of the line 3, which is 12″, now is the constant quantity and the 30° mark upon line 4 will correspond to the 60° mark in the original triangle. Therefore, assuming that the roof to be constructed has a rise of 6′ and a pitch of 61°, which are the only known quantities, the 29° mark upon the angle scale is referred to. This mark represents 30° minus 1°, the reading being calculated now between the 30° point and 0°, which latter is represented by the point 5. The 29° point, which corresponds to 61°, coincides with $6\frac{5}{8}''$ upon the base line of the triangle. It is therefore possible to obtain the equation $$\frac{x}{72} = \frac{6\frac{5}{8}}{12}.$$

Therefore, $x=42\frac{1}{4}''$ or 3′ $6\frac{1}{4}''$. The dimensions of other roofs whose pitches vary between 60° and 90° may be obtained in like manner.

From the foregoing description, taken in connection with the accompanying drawings, it should be apparent that we have provided a scale which may be used readily and accurately in roof framing and similar operations, even by unschooled carpenters who can understand its simple operations readily but would be incompetent to carry out the more difficult mathematical computations necessary when using the ordinary well known measuring instruments in this connection.

What is claimed is:

In a device of the kind described, in combination, a measuring member having two legs, disposed at right angles, one of said legs being twice the length of the other, each of said legs being inscribed with a medial line, said lines being joined and divided respectively into twelve inches and twenty four inches by graduated measuring marks which are disposed toward the outer edges of the said legs, one of said lines having, opposite its respective measuring marks, designated indications representing various degrees of a circle, all of said degrees not exceeding 60 degrees forming a primary series of designated markings inscribed *seriatim* upon said longer leg, the markings for 60 degrees up to 90 degrees being indicated by their co-sine values inscribed *seriatim* next adjacent to said primary series of markings corresponding to their sine equivalent, whereby to dispense with the enumeration *seriatim* of all the degrees of a quadrant.

In testimony whereof we affix our signatures in presence of two witnesses.

FRANK L. BOONE.
ELI T. BOONE.

Witnesses:
O. GIRARD,
ALVIN JACKSON.

Copies of this patent may be obtained for five cents each, by addressing the "Commissioner of Patents, Washington, D. C."